(Model.)
I. L. ROBERTS.
ELECTROLYTIC APPARATUS.
No. 442,396. Patented Dec. 9, 1890.
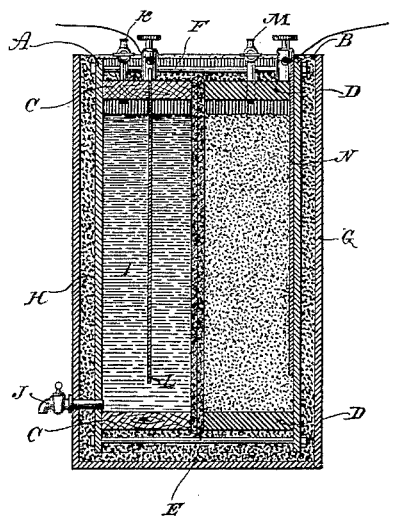
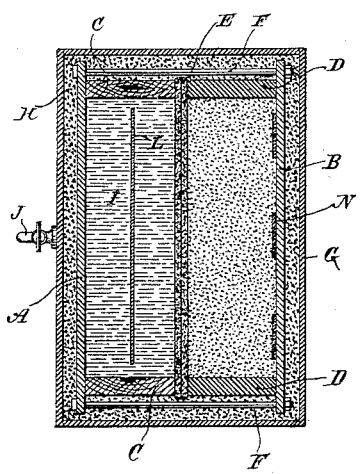
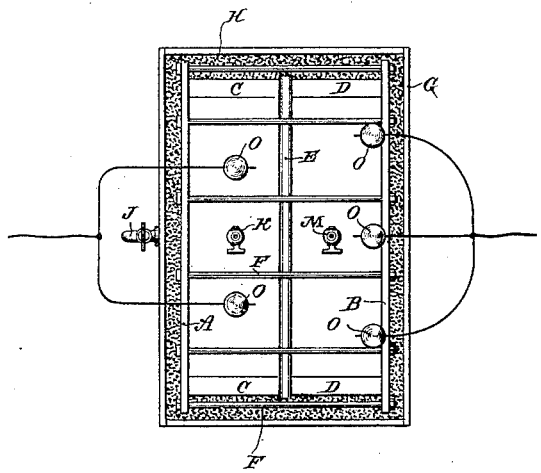
Witnesses:
Raphaël Netter
Frank E. Hartley
Inventor
Isaiah L. Roberts
By
Duncan, Curtis & Page
Attorneys.

UNITED STATES PATENT OFFICE.

ISAIAH L. ROBERTS, OF BROOKLYN, ASSIGNOR OF ONE-HALF TO THOMAS H. McGRAW, OF POUGHKEEPSIE, NEW YORK.

ELECTROLYTIC APPARATUS.

SPECIFICATION forming part of Letters Patent No. 442,396, dated December 9, 1890.

Application filed March 14, 1889. Serial No. 303,307. (Model.)

*To all whom it may concern:*

Be it known that I, ISAIAH L. ROBERTS, a citizen of the United States, residing at Brooklyn, in the county of Kings and State of New York, have invented certain new and useful Improvements in Electrolytic Apparatus, of which the following is a description, reference being had to the drawings accompanying and forming a part of the same.

The apparatus which forms the subject of this application is primarily designed for the electrolytic decomposition of a solution of chloride of sodium for the manufacture of caustic soda. This apparatus I shall describe and then indicate the part or parts which I have invented and which I believe to be new, together with their objects and uses for other purposes and the advantages derived therefrom. I form a closed vat or tank divided into two compartments by a diaphragm. One of these compartments, or that intended for the cathode, I fill to nearly its top with a solution of common salt and fix within it an electrode of any conducting material which will not be chemically altered by the products of the electrolytic action and which is provided with suitable terminals. The other compartment I fill with powdered coke or gas-retort carbon, into which extend conductors that convey the current to other terminals. Openings are provided for each compartment for the introduction and withdrawal of the solution and for the escape of gas. If this apparatus be connected up in an electric circuit, the coke or carbon to the positive pole, so that it becomes the anode, the chlorine radical will be transferred from the other compartment and will be liberated in the anode-chamber as chlorine gas. On the other hand, the transferrence of the chlorine radical from the salt leaves the sodium in the cathode-compartment, which, taking up atom for atom, the hydrogen of the water liberates the remaining hydrogen, which escapes as gas. A solution of sodium hydrate or caustic soda may thus be produced of any degree of concentration and purity. The escaping gases—hydrogen on the one side and chlorine gas on the other—may be collected and utilized in various ways.

The mechanical construction of the tank or vat is evidently a feature of comparatively little importance in respect to the main objects of the invention. It is desirable, however, that it be constructed in such manner as to facilitate the collection of the liberated gases and that such materials be used in its composition as will not be readily destroyed by the action of the solutions or gases.

Heretofore in all electrolytic processes of which I am aware both electrodes of the vat have been immersed in a liquid solution. I have discovered that much better results are obtained by using finely-divided coke or carbon in the anode-compartment, since it gives off freely the transferred chlorine as gas and reduces to a minimum the tendency of the chlorine radical to recombine with its base. The action of the apparatus is improved by moistening the coke with an acidulated or saline solution.

The underlying principle or idea which I have had in using the finely-divided carbon is to liberate directly chlorine gas, and any substance not a fluid, which will not be seriously attacked by the acid radical and which will accomplish the same result, I regard as within my invention. Incidentally the mass of carbon performs another useful purpose in acting as a support for the diaphragm, which would otherwise, particularly when of large size, be bulged out by a solution in either compartment when there is none in the other. I use a substantially non-porous diaphragm—that is to say, a diaphragm or partition, which, while being practically impervious to the fluids or solutions, does not interrupt or seriously prevent a free electrolytic action. For this purpose any non-porous or equivalent diaphragm may be used practically which will not be destroyed by the action thereon of the solutions or the products of electrolytic action. I prefer a diaphragm made in the following manner: I place two asbestus boards of the desired size on opposite sides of a piece of asbestus cloth. I then secure them together by a covering of, for example, cotton cloth, which is sewed up and which is merely designed to hold the fibers together while undergoing subsequent treatment. The whole is then exposed for about twenty-four hours or more, according to the thickness of the diaphragm, to the action of a solution of sulphuric or muriatic acid, preferably the latter. It is then squeezed and rolled out and again treated with the acid, after which it is rolled and worked in fresh water until its soluble constituents are removed, after which it is pressed. Too thin a diaphragm of this kind will not, I have found, prevent the recombination of the products resulting from electrolytic action; but in cells of twelve or fourteen inches square and larger I have found that a diaphragm composed of two boards, each about one-fourth of an inch thick, making with the asbestus cloth when dry a pile about three-fourths of an inch in thickness, prevents very perfectly recombination, and is very efficient.

The cathode of such a cell as I have described may be of copper or any conductor that will not combine chemically with the solution or the constituents into which it is or may be resolved by electrolytic action. The conductors which extend down into the coke or carbon should be of some material that will not be attacked by the acid radical or gas. For example, in electrolyzing chloride-of-sodium solutions I may use pure carbon rods or any metal or alloy that will not be attacked by the chlorine. I have used with good results an alloy of lead four and a half parts, antimony four and a half parts, and mercury one part.

This form of electrolytic tank or cell I may use for the electrolysis of any other solutions or electrolytes.

The preferred construction and manner of using this invention are illustrated in the accompanying drawings.

Figure 1 is a vertical cross-section of my improved device. Fig. 2 is a horizontal cross-section, and Fig. 3 is a top plan view, of the same.

The vat or cell proper is composed of the boards A B and the pieces C D. The parts A C may be of wood or other material not attacked by the solution in the cathode-compartment, whose sides they form. The parts B D, however, should be of glass, slate, or some other substance not affected by chlorine or the other products of decomposition. The parts named are joined together with a diaphragm or partition E between them, and bolts F are employed to secure them firmly together. The tank or cell thus formed and containing the two compartments is inserted in an outer and slightly-larger box or tank G and the intervening space filled in with tar, asphalt, or other non-conducting waterproof compound H.

The cathode-compartment I is provided near its bottom with a cock J for drawing off the electrolyzed solutions. In the top of the compartment is an inlet K, through which the solution to be treated is introduced, and through which the gas escapes.

L is the cathode, which, as above explained, should be of copper or other like conductor.

The anode-compartment on the other side of the diaphragm is filled with powdered or finely-divided coke, carbon, or other comminuted conductor, which will not be attacked by the transferred radical. It is preferably moistened with any good conducting-fluid. M is a vent or outlet in the top of this compartment for the escape of the gas liberated by the coke. Conducting bars or strips N, of pure carbon or other like conductor, extend down through the top of the compartment into the coke. The electrodes are provided with suitable terminals or binding parts O, by means of which the connections are made.

The mechanical structure of the tank or vat may be greatly varied, as above set forth.

The diaphragm herein shown and described is not claimed by itself, as it forms the subject of an application of even date herewith.

The process herein described of treating the asbestus for the purpose of rendering the same available for diaphragms is not claimed herein, as it forms the subject of another application of even date herewith.

What I claim is—

1. An electrolytic apparatus consisting of a tank or vat divided with an electrolytic diaphragm or partition into two compartments containing conductors or electrodes, one of said compartments being adapted to contain the solution to be decomposed and the other or anode compartment filled with a finely-divided conducting substance, such as powdered coke or its equivalent, substantially as described.

2. An electrolytic apparatus comprising electrodes and a tank divided into cathode and anode compartments by a substantially non-porous diaphragm, the anode-compartment being filled with finely-divided coke or its equivalent, substantially as set forth.

3. An electrolytic apparatus consisting of a tank or vat divided by an electrolytic diaphragm into anode and cathode compartments, the anode-compartment being filled with powdered coke or its equivalent moistened with a conducting solution, substantially as set forth.

4. In an electrolytic apparatus, the combination, with the electrodes, of a diaphragm composed of asbestus freed from its soluble constituents and forming two electrode-compartments, one adapted to receive the solution to be decomposed, the other filled with finely-divided coke or its equivalent, as set forth.

ISAIAH L. ROBERTS.

Witnesses:
ROBT. F. GAYLORD,
PARKER W. PAGE.